(12) United States Patent
Szegeny et al.

(10) Patent No.: US 8,608,244 B2
(45) Date of Patent: Dec. 17, 2013

(54) VEHICLE SEAT

(75) Inventors: Peter Szegeny, Leverkusen (DE); Stefan Flucht, Solingen (DE); Guido Haladuda, Leichlingen (DE)

(73) Assignee: Johnson Controls GmbH, Burscheid (DE)

( * ) Notice: Subject to any disclaimer, the term of this patent is extended or adjusted under 35 U.S.C. 154(b) by 305 days.

(21) Appl. No.: 12/528,614

(22) PCT Filed: Feb. 25, 2008

(86) PCT No.: PCT/EP2008/001474
§ 371 (c)(1),
(2), (4) Date: Dec. 21, 2010

(87) PCT Pub. No.: WO2008/104348
PCT Pub. Date: Sep. 4, 2008

(65) Prior Publication Data
US 2011/0080026 A1  Apr. 7, 2011

(30) Foreign Application Priority Data

| Feb. 26, 2007 | (DE) | 10 2007 009 622 |
| Mar. 16, 2007 | (DE) | 10 2007 013 376 |
| Jun. 29, 2007 | (DE) | 10 2007 030 332 |
| Nov. 16, 2007 | (DE) | 10 2007 055 082 |

(51) Int. Cl.
*B60N 2/20* (2006.01)

(52) U.S. Cl.
USPC .................................................. 297/378.1

(58) Field of Classification Search
USPC ............ 297/248, 353, 378.1, 378.12
See application file for complete search history.

(56) References Cited

U.S. PATENT DOCUMENTS

| 301,913 A | * | 7/1884 | Miller ........................... 297/313 |
| 2,716,775 A | * | 9/1955 | Kenimer ........................ 16/357 |
| 4,636,003 A | | 1/1987 | Siebler |
| 4,695,094 A | * | 9/1987 | Siebler ......................... 297/331 |
| 5,681,077 A | | 10/1997 | Hashimoto |
| 6,070,934 A | | 6/2000 | Schaefer et al. |

(Continued)

FOREIGN PATENT DOCUMENTS

| DE | 3507894 A1 | 10/1985 |
| DE | 4337938 C1 | 5/1995 |

(Continued)

OTHER PUBLICATIONS

Deutsches Patent UND Markenamt, Search Report, DE102007056082, Aug. 18, 2008, Germany.

(Continued)

*Primary Examiner* — David Dunn
*Assistant Examiner* — Timothy J Brindley
(74) *Attorney, Agent, or Firm* — Butzel Long (57) ABSTRACT

A vehicle seat having a seat part and a backrest that can be inclined relative to the seat part to allow transfer between an in-use position and a stowed position includes structure that causes the length of the backrest to change during the transfer. In a particular embodiment, the length of the backrest is greater in the in-use position than in the stowed position to provide satisfactory comfort and safety to an occupant seated in the vehicle seat when it is in the in-use position and to provide a compact arrangement in the stowed position.

12 Claims, 11 Drawing Sheets

(56) References Cited

U.S. PATENT DOCUMENTS

| | | | |
|---|---|---|---|
| 7,097,246 B2 * | 8/2006 | Sedlatschek et al. | 297/284.3 |
| 2002/0190550 A1 * | 12/2002 | Huang | 297/248 |
| 2005/0052062 A1 * | 3/2005 | Shiraki | 297/364 |
| 2008/0185893 A1 | 8/2008 | Behrens | |

FOREIGN PATENT DOCUMENTS

| | | | | |
|---|---|---|---|---|
| DE | 69616228 T2 | | 6/2002 | |
| DE | 602004002914 T2 | | 4/2007 | |
| DE | 102007005143 A1 | | 8/2008 | |
| EP | 1529681 A | | 5/2005 | |
| EP | 1632389 A | | 3/2006 | |
| GB | 2359015 A | | 8/2001 | |
| JP | 2002225603 A | | 8/2002 | |
| WO | WO 2004/060713 | * | 7/2004 | B60N 2/30 |

OTHER PUBLICATIONS

Patent Treaty Cooperation, International Preliminary Report on Patentability, PCT/EP2008/0014174, Feb. 26, 2008.

Patent Treaty Cooperation, International Search Report, PCT/EP2008/001474, May 20, 2008.

Patent Treaty Cooperation, International Preliminary Report on Patentability, PCT/EP2008/0014174, Feb. 26, 2008 (Translation Sep. 17, 2009).

* cited by examiner

VEHICLE SEAT

CROSS REFERENCE TO RELATED APPLICATIONS

The present application is a U.S. National Stage filing of International Application No. PCT/EP2008/001474, filed on Feb. 25, 2008, titled "VEHICLE SEAT" which claims priority to German Patent Application No. DE 10 2007 009 622.6, filed Feb. 26, 2007; German Patent Application No. DE 10 2007 013 376.8, filed Mar. 16, 2007; German Patent Application No. DE 10 2007 030 332.9, filed Jun. 29, 2007; and German Patent Application No. DE 10 2007 055 082.2, filed Nov. 16, 2007, the entire disclosures of which are incorporated herein by reference.

BACKGROUND

The present disclosure relates generally to a vehicle seat having a seat part and a backrest, the inclination of backrest relative to the seat part is adjustable between an in-use position and a stowage position and vice versa. The present disclosure generally further relates in particular to a middle seat of a row of seats.

Such vehicle seats are sufficiently well known from the prior art and are described for example in U.S. Pat. No. 6,070,934, issued Jun. 6, 2000, in the name of Shaefer et al, DE 3507894 C2, published Oct. 3, 1985, in the name of Siebler; DE 60 2004 002 914 T2, published Apr. 12, 2007, in the name of Combeau; as well as in DE 10 2007 013 376.8.

SUMMARY

In one exemplary embodiment, there is disclosed a vehicle seat having a seat part and a backrest, the inclination of which relative to the seat part is adjustable and which may be transferred from an in-use position to a stowage position and vice versa, the length of the backrest changing upon such transfer.

In one exemplary embodiment, the vehicle seat is simple and inexpensive to produce and has very compact dimensions in its stowage position. Transfer of the vehicle seat from the in-use position into the stowage position and vice versa can be performed easily by the user without much effort.

In one exemplary embodiment, the vehicle seat includes a seat part and a backrest. The backrest may be reversibly transferred between an in-use position, in which a vehicle occupant may sit on the vehicle seat and the backrest is substantially vertical, and a stowage position, in which the backrest is arranged substantially horizontally over the sitting area. In the in-use position the inclination of the backrest may be adjusted to improve occupant comfort and also for the purpose of easy entry.

In the one exemplary embodiment, the length of the backrest changes upon transfer between the in-use and stowage positions. In particular, the length of the backrest is greater in the in-use position than in the stowage position, to provide satisfactory comfort and satisfactory safety to an occupant and to provide a compact construction in the stowage position. Lengthening the backrest is preferably effected by displacing at least part of the backrest in particular along a guide. The guide is preferably located at the end of the backrest facing the seat part and displacement is effected under spring loading. A spring can be located between the backrest and the guide and the spring force is greater in the stowage position than in the in-use position. The spring may, for example, comprise a spiral spring or a gas spring. The spring may assist in transferring the backrest from the stowage position into the in-use position. Preferably, a cover enclosing the backrest is sufficiently flexible to stretch appropriately on transfer of the backrest from the stowage into the in-use position and/or to comprise a reserve, which is reversibly available.

In the one exemplary embodiment, the backrest is preferably mounted rotatably on at least one articulated lever, which is arranged displaceably on the seat part. The backrest is preferably mounted with two articulated levers, which are located to the right and left sides of the backrest. The articulated lever(s) is/are arranged in particular so as to be displaceable parallel to the side pieces of the seat part. To this end, the vehicle seat preferably includes guides, which are arranged on the side pieces of the vehicle seat and in which the articulated levers are guided. In one exemplary embodiment the articulated lever is banana-shaped.

In the one exemplary embodiment, the vehicle seat includes at least one articulated member, which is arranged in each case rotatably with one end on the seat part and with the other end on the part. The vehicle seat preferably includes two such articulated members.

In one exemplary embodiment, an end stop for the rotation of the guide relative to the articulated member is preferably arranged on the articulated member. In this exemplary embodiment, the guide and thus the backrest may accordingly be pivoted within a given range without the articulated member also rotating. If this range is exceeded, the guide and the articulated member rotate together. The above-stated range is in particular the range within which the backrest is pivoted for comfort adjustment or easy entry purposes.

In the one exemplary embodiment, a spring is arranged between the seat part and the articulated member, which spring holds the articulated member in its position under certain loads. Only when this load, in particular a torque, is exceeded does the articulated member rotate relative to the seat part. In one exemplary embodiment, the spring is preferably a torsion spring.

In one exemplary embodiment, the vehicle seat includes at least one slotted guide. In another exemplary embodiment, two slotted guides are preferably present, which are arranged to the right and left of the backrest. In another exemplary embodiment, the slotted guide is fixed rotatably to the backrest with a fixing device or means.

In one exemplary embodiment, the slotted guide preferably includes a first and a second opening that take the form of elongate holes. The second opening is arranged in the manner of an arc of a circle around the fixing device of the slotted guide. In one exemplary embodiment, the openings may be joined together.

In one exemplary embodiment, a projection, for example a pin, is arranged on the articulated lever, which projection cooperates with the opening and the movement of the projection is limited by the interaction between the projection and the opening.

In one exemplary embodiment, the projection, for example a pin, is preferably arranged on the articulated member, and the projection cooperates with the opening. The opening controls movement of the projection and thus movement of the articulated member upon transfer of the backrest out of the easy entry position into the stowage position.

In one exemplary embodiment, the articulated lever preferably substantially covers the articulated member at all times, whereby the risk of injury on movement of the backrest is at least reduced.

In one exemplary embodiment, the vehicle seat preferably includes an auxiliary device, for example an energy storage device or means, such as a spring, which simplifies adjustment of the backrest from the stowage into the in-use position.

In one exemplary embodiment, the backrest may be locked both in the in-use and in the stowage position.

In one exemplary embodiment, the vehicle seat is preferably part of a row of seats, which row of seats comprises at least one further seat whose backrest preferably likewise comprises inclination adjustment. The axis of rotation for inclination adjustment of the backrest of the further seat preferably corresponds to the axis of rotation of the backrest of the vehicle seat of the exemplary embodiment. In one exemplary embodiment, the vehicle seat is preferably the middle seat of a row with three seats.

In one exemplary embodiment, the vehicle seat can be locked to the other seat at least in the in-use position. In particular, in the one exemplary embodiment, the seat parts of the two seats can be locked together.

In one exemplary embodiment, the vehicle seat can be stowed in its stowage position under the seat part of the further seat.

The vehicle seat of the exemplary embodiment s disclosed is explained below with reference to FIGS. 1-14. These explanations are given merely by way of example and do not restrict the general concept of the invention.

DETAILED DESCRIPTION OF THE DISCLOSURE

Figure 1:
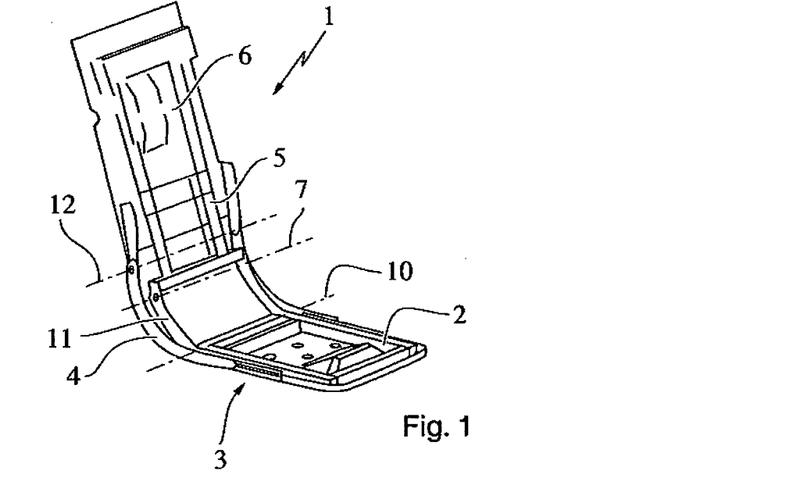
FIG. 1 shows an embodiment of the vehicle seat according to one exemplary embodiment.
Figure 7:
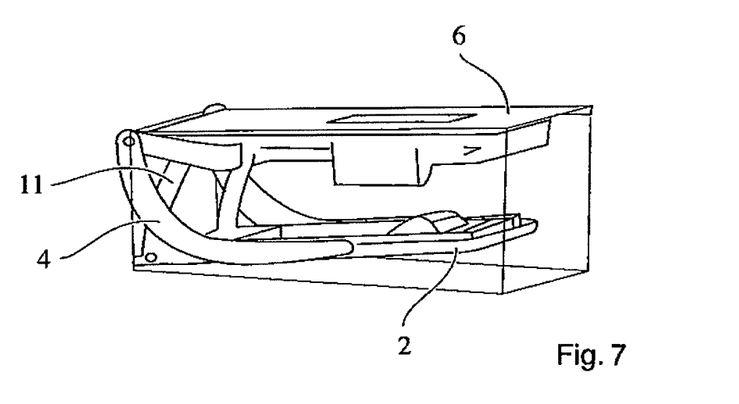
FIG. 7 shows the vehicle seat in the stowage position.

FIG. 1 shows a vehicle seat 1 according an exemplary embodiment of the disclosure in its in-use position, in which an occupant may sit thereon. The vehicle seat 1 according to the disclosure illustrated in FIG. 1 includes a backrest 6 and a seat part 2. The backrest 6 can be transferred from the in-use position into a stowage position (FIG. 7). In the in-use position the inclination of the backrest 6 may be adjusted for comfort adjustment and also for the purpose of easy entry. The backrest 6 includes a guide 5, along which the backrest 6 is displaceably mounted and with which its length may thus be changed. The backrest 6 is connected rotatably above the guide 5 to two articulated levers 4 (axis of rotation 12). If the vehicle seat according to the disclosure takes the form of a middle seat of a row of seats, the axis of rotation 12 of the backrest 6 of this vehicle seat 1 preferably corresponds to the axis of rotation of the backrest 6 of a side vehicle seat (not shown) arranged next thereto. The guide 5 is connected rotatably to in each case one end of two articulated members 11 (axis of rotation 7). The other end of the articulated members 11 is in each case connected to the seat part and there forms the axis of rotation 10. The seat part 2 as shown includes two sliding rails 3, in which the front ends of the for example banana-shaped articulated lever 4 are mounted displaceably and rotatably. In the in-use position the front ends of the articulated lever 4 slide backwards and forwards in the sliding rails 3.

Figure 2:
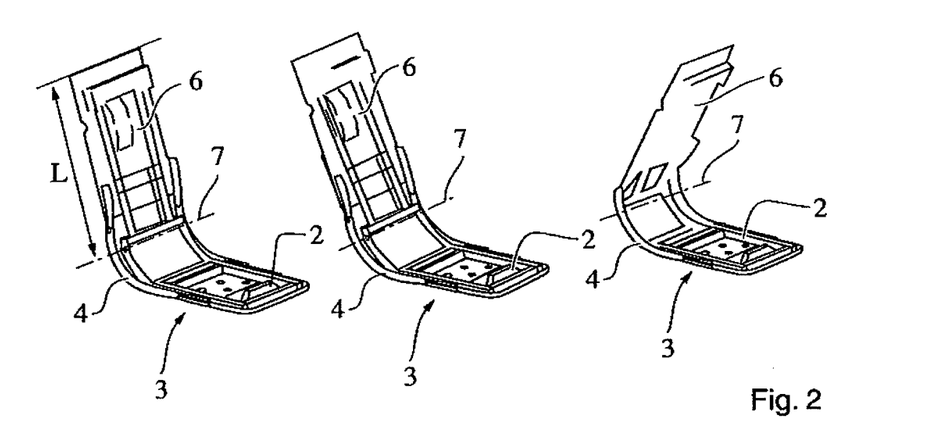
FIG. 2 shows inclination adjustment of the vehicle seat according to FIG. 1.

FIG. 2 shows pivoting of the backrest 6 in the in-use position. The left-hand illustration shows the backrest 6 in a substantially vertical position. The middle position is the maximum backwards inclination and the right-hand illustration shows the vehicle seat in its easy entry position. During inclination adjustment according to FIG. 2 the backrest 6 pivots around the axes of rotation 12 and 7. While the articulated members 11 remain immobile during all these movements, the position of the articulated lever 4 moves in the longitudinal direction along the guides 3, which are arranged to the right and left of the seat part 2. The articulated levers 4 are not rotated, however.

Figure 3:
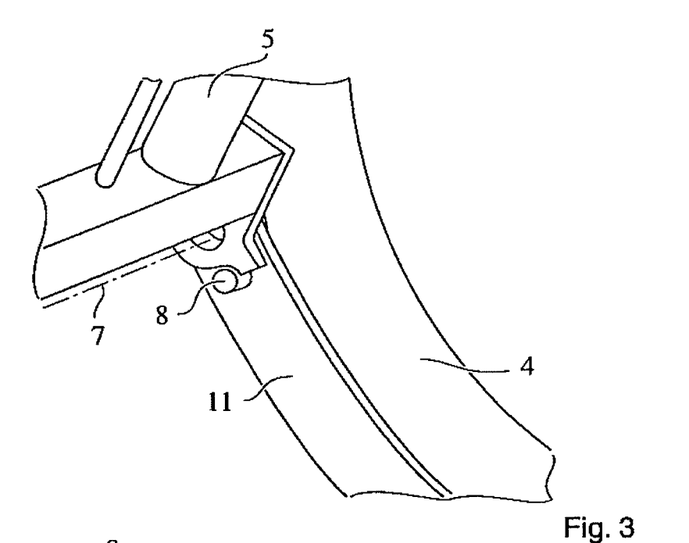
FIG. 3 shows the displaceable part limit stop.

As is shown in FIG. 3, when the backrest 6 reaches a predetermined forward inclination of, for example the easy entry position, rotation of the guide and thus of the backrest 6 relative to the articulated members 11 is stopped by an end stop 8 arranged thereon. The easy entry position generally corresponds to about a 35° to 40° inclination of the backrest 6 relative to vertical.

Figure 4:
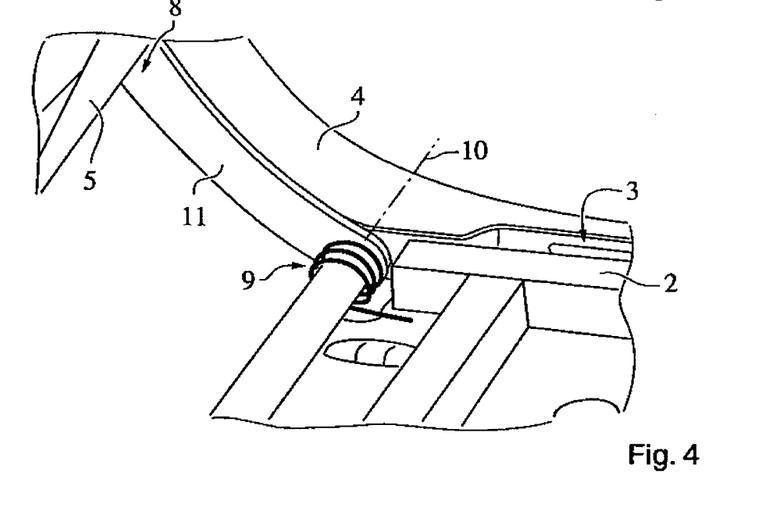
FIG. 4 shows the torsion spring on the articulated member.

FIG. 4 shows a torsion spring 9 that is arranged in the region of the lower axis of rotation 10, the torsion spring 9 being mounted between the articulated member 11 and the seat part 2 and holding the articulated member 11 arranged between seat part 2 and backrest 6 against the frictional forces in the axis of rotation 7 in its illustrated basic position.

Figure 5:
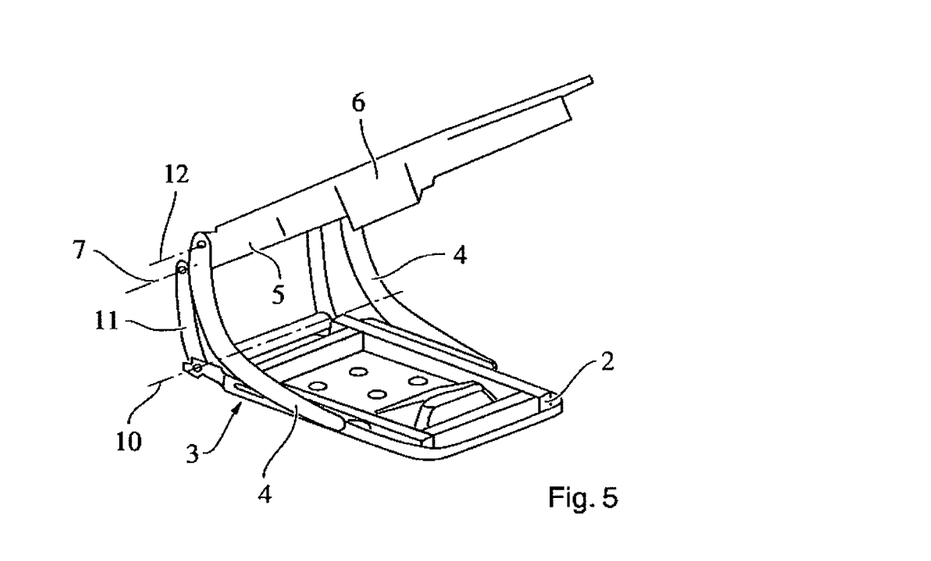
FIG. 5 shows the vehicle seat of one exemplary embodiment upon transfer of the backrest into the stowage position.
Figure 6:
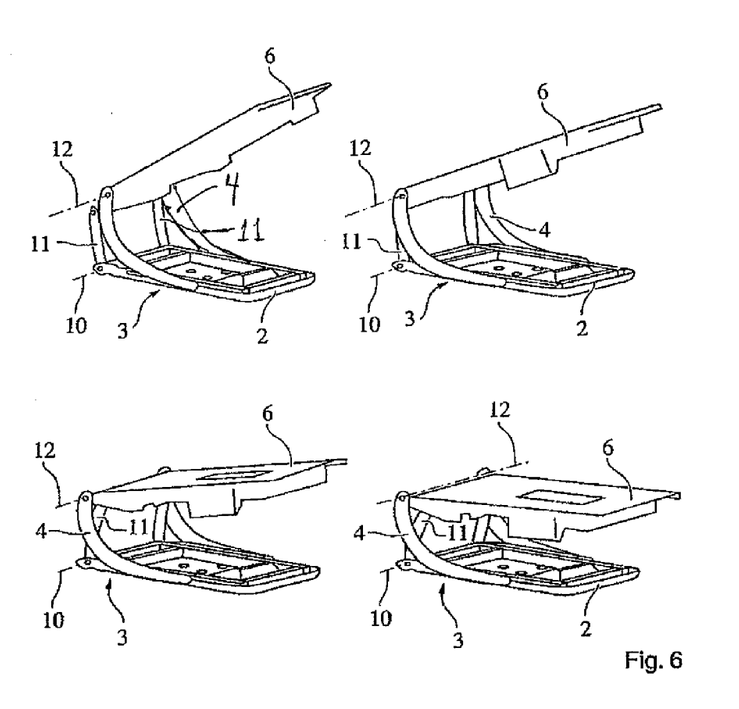
FIG. 6 shows transfer of the backrest from the easy entry position into the stowage position.

Further pivoting of the backrest 6 beyond the easy entry position into the stowage position is illustrated in FIGS. 5 and 6. The backrest 6 pivots forwards around the axis of rotation 7, until the arcuate articulated levers 4 have reached the front end of the sliding rails 3. In the process, the articulated member 11 is rotated in the clockwise direction about the axis 10 as a result of the limit stop 8 (as shown in FIG. 5). Upon further rotation of the backrest 6 in the clockwise direction, the latter rotates in the joint between backrest 6 and articulated levers 4 (axis of rotation 12), the articulated member 11 rotating in the lower joint (axis of rotation 10). In this way, the backrest 6 is drawn into the slide guide 5 against the force of a gas spring (FIG. 6). The backrest 6 thus becomes increasingly short in length.

FIG. 7 shows the vehicle seat 1 in its compact stowage position. In this position the backrest 6 is shorter than in the in-use position and does not project beyond the seat part 2. In this position the vehicle seat 1 can be stowed for example under the seat part of a neighboring seat. Raising the backrest 6 into the upright in-use position may be simplified by a gas spring, not shown.

Figure 8:
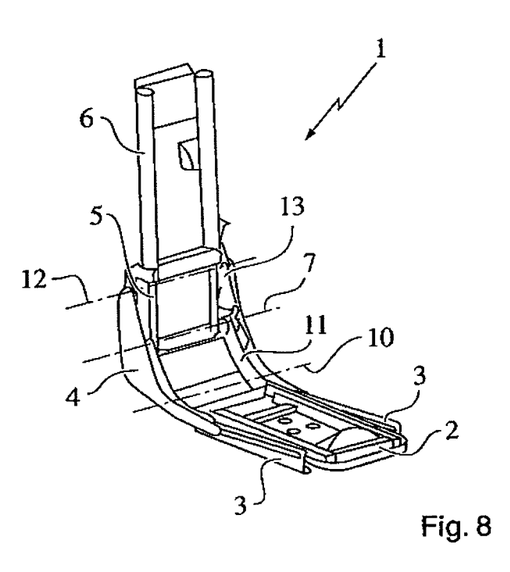
FIG. 8 shows the vehicle seat with the slotted guide.

FIG. 8 shows a further exemplary embodiment of the vehicle seat 1. In the present example the articulated levers 4 are constructed in such a way that they at least partially cover the articulated members 11 at all times. This is intended to rule out injury due to the shearing action between the articulated lever 4 and the articulated member 11 resulting from pivoting of the backrest 6. Furthermore, the vehicle seat 1 of the present embodiment includes two slotted guides 13, which are arranged to the right and left of the backrest 6.

Figure 9:
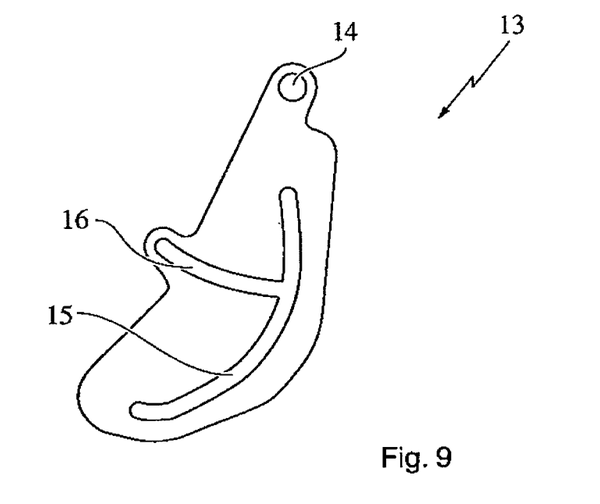
FIG. 9 shows the slotted guide.

This slotted guide is shown in detail in FIG. 9 and includes an opening 14, by means of which the slotted guide may be attached to the backrest 6 in the region of the axis of rotation 12. Moreover, in the slotted guide 13 a first opening 15 and a second opening 16 are provided, which each take the form of elongate holes. The elongate hole 16 takes the form of a segment of an arc of a circle, the center of which circle is the center of the opening 14.

Figure 10:
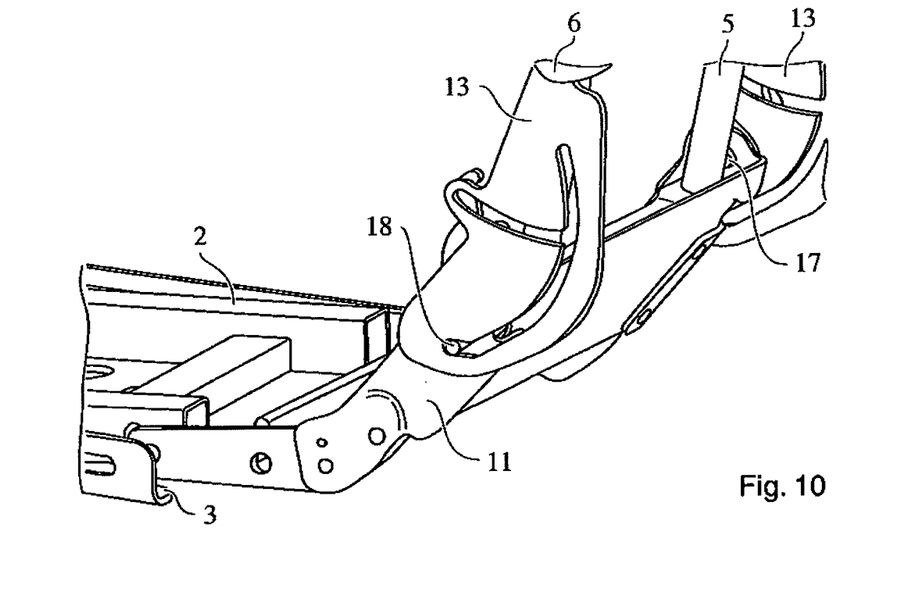
FIG. 10 shows the interaction between the slotted guide and the articulated member 11.

As shown in FIG. 10, a pin 18 is arranged on the articulated member 11, which pin engages in the elongate hole 15 and moves along the elongate hole. Furthermore, this illustration shows the fixing device for fixing the guide 5 to the articulated members 11.

Figure 11:
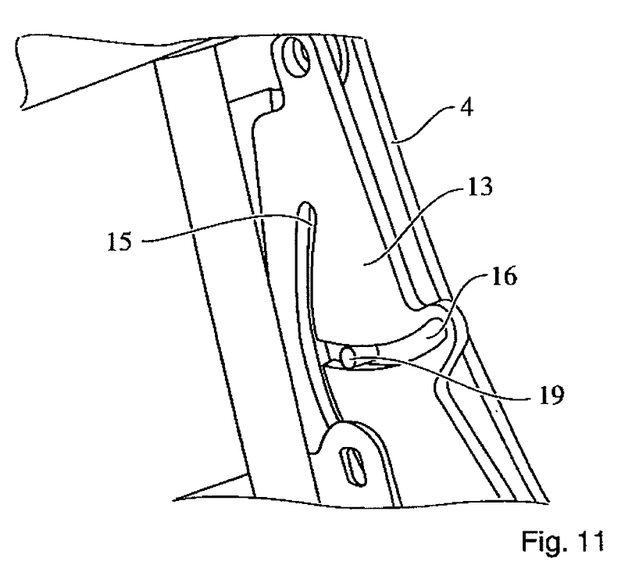
FIG. 11 shows the interaction between the slotted guide and the articulated lever 4.
Figure 12:
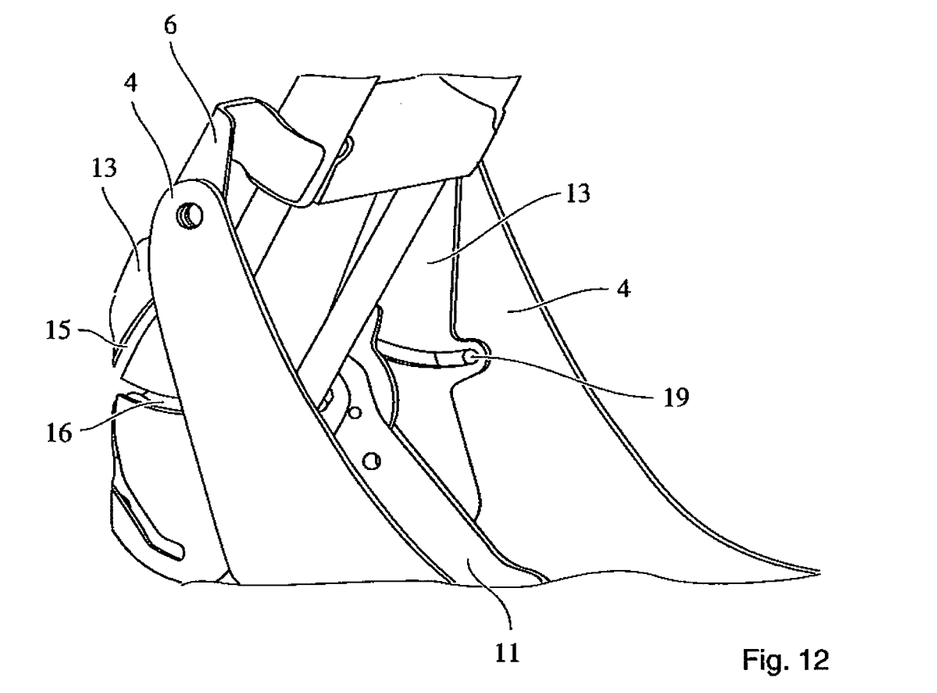
FIG. 12 shows a further detail of the vehicle seat according to FIGS. 6 through 11.

FIGS. 11 and 12 illustrate the pin 19 engaging in the elongate hole 16, which pin 19 is arranged on the articulated lever 4. With the pin 19 cooperating with the elongate hole 16, the movement of the articulated lever 4 relative to the slotted guide 13 is limited.

Figure 13:
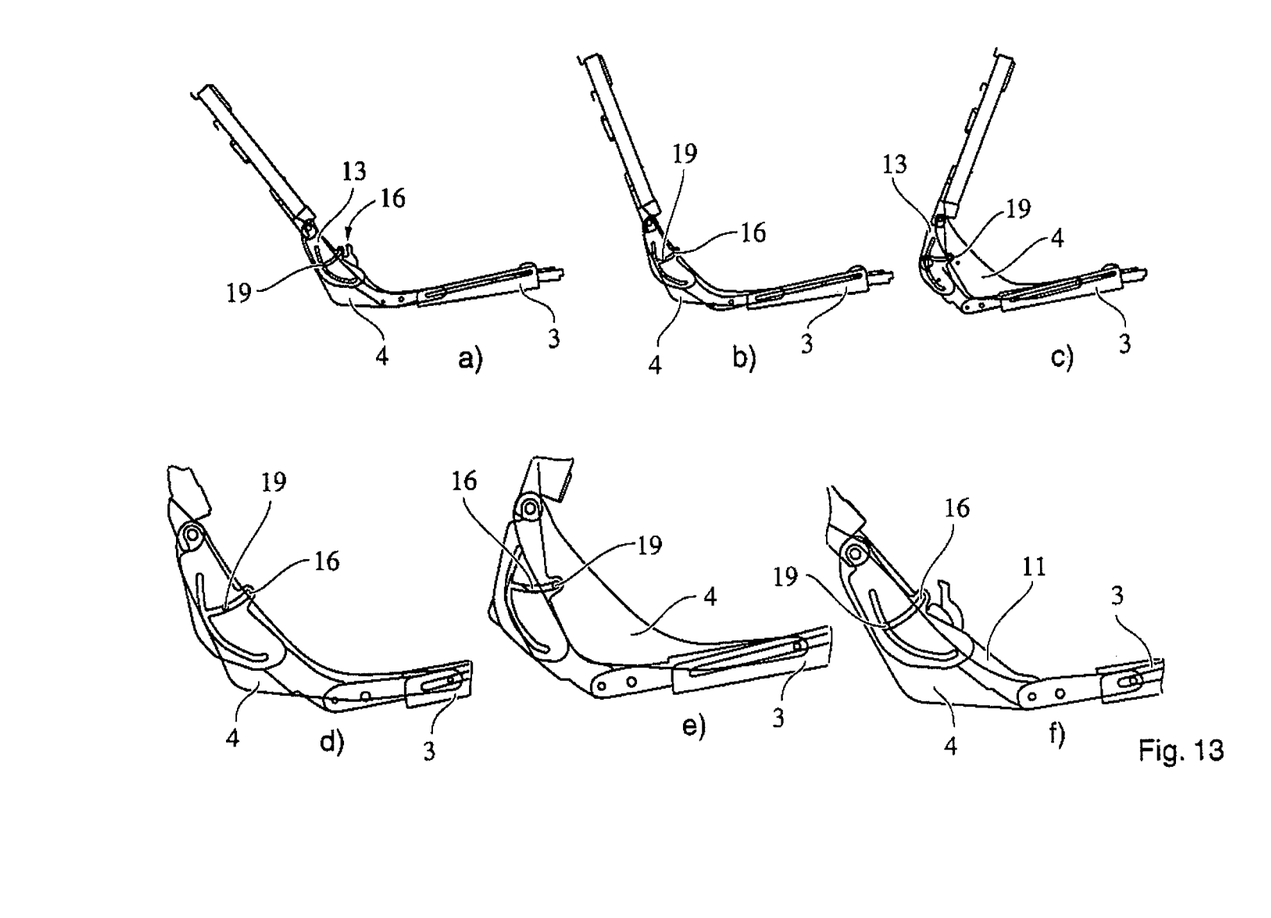
FIG. 13 shows pivoting of the backrest of the vehicle seat according to FIGS. 8 through 12.

FIGS. 13a through 13c show pivoting of the backrest 6 in the region of the in-use position and the consequently changing position of the pin 19 within the slotted guide 16. FIG. 13a shows the rearmost position of the backrest 6. In this position the pin 19 is at the start of the opening 16. If the backrest is then pivoted in the clockwise direction, the pin 19 travels to the right (FIG. 13b), until it reaches its end stop in the region of the easy entry position (FIG. 13c). Since the pin 19 is arranged on the articulated lever 4, the latter likewise moves, as shown in FIGS. 13a through 13c. The articulated member 11 remains immobile, on the other hand.

FIGS. 13d to 13f show the above-explained interrelationship again in detail, with FIG. 13f showing the backrest 6 folded back to its furthest point, FIG. 13e showing the easy entry position of the backrest and FIG. 13d showing an intermediate position of the backrest 6 between the two positions according to FIGS. 13e and 13f.

Figure 14:
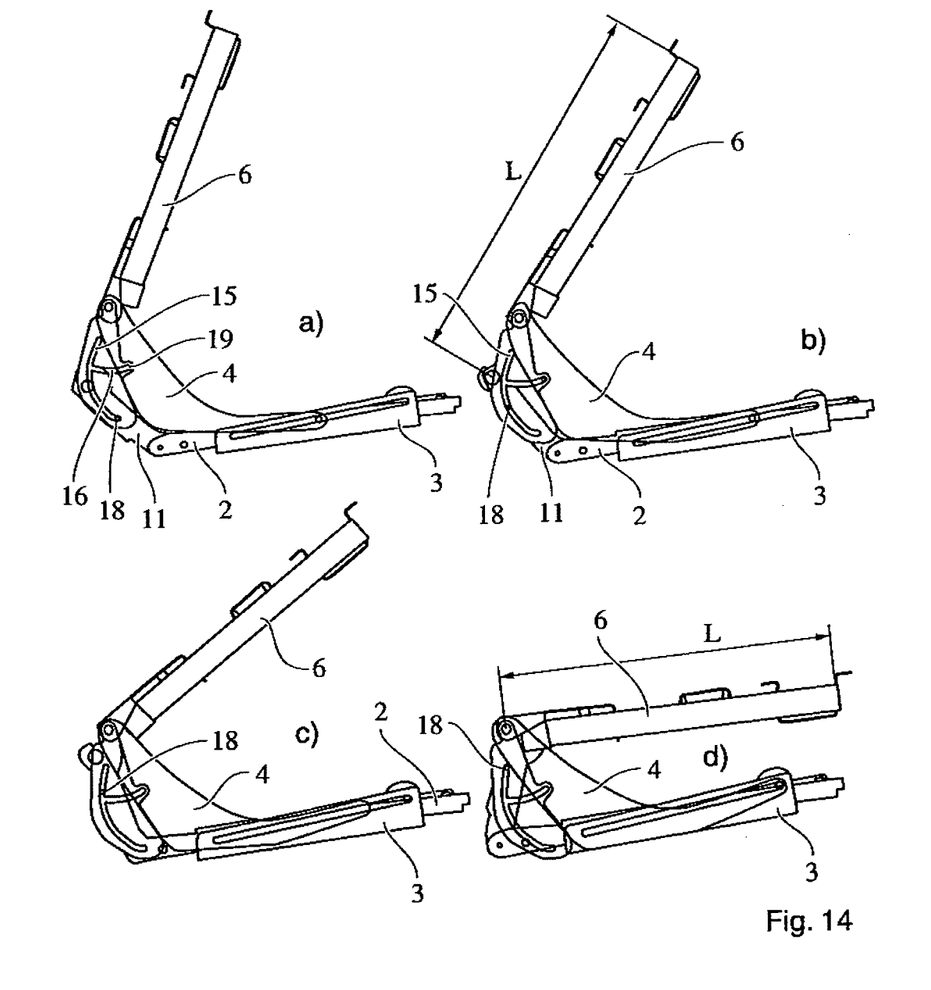
FIG. 14 shows transfer of the backrest of the vehicle seat according to FIGS. 8 through 12 from the easy entry position into the stowage position.

FIG. 14 shows the movement or transfer of the backrest 6 from the easy entry position into the stowage position. FIG. 14a shows the easy entry position, while FIG. 14d shows the backrest 6 in the stowage position. Throughout transfer from the easy entry position into the stowage position, the pin 19 remains in its right-hand end position, while the pin 18 travels from its lowest position in FIG. 14a into its top position in FIG. 14d. In addition, during this process the articulated lever 4 is displaced along the guide 3 from a rear position in FIG. 14a into its foremost position in FIG. 14d. As a result of the slotted guide 13, the length L of the backrest is at the same time reduced throughout the entire pivoting process, i.e. the backrest is drawn into the guide 15. In this way, the force needed to transfer the backrest from the easy entry position into the stowage position is evenly distributed over the entire movement.

Transfer of the backrest 6 back into the in-use position may be assisted by a spring, for example by a gas spring. The vehicle seat as best shown in FIG. 14d may be stowed under the seat part of a neighboring seat.

The invention claimed is:

1. A vehicle seat having a seat part and a backrest assembly, inclination of the backrest assembly relative to the seat part (2) being adjustable between an in-use position and a stowed position wherein the backrest assembly includes a backrest member slidably movable relative to a slide guide, the slide guide and the backrest member each being rotatable relative to respective axes that are translationally displaced, and wherein the backrest member and the slide guide are joined to the seat part so that the translational displacement of the axes decreases during adjustment from the in-use position to the stowed position, whereby the length of the backrest assembly decreases during the adjustment, and, further comprising two members that are each pivotally connected at one end to the seat part and pivotally connected at another end to the slide guide.

2. The vehicle seat of claim 1, wherein the backrest is mounted rotatably on at least one lever arranged displaceably on the seat part.

3. The vehicle seat of claim 1, wherein the guide is spring biased.

4. The vehicle seat of claim 1, further comprising an end stop for limiting rotation of the guide, the end stop being arranged on the member.

5. The vehicle seat as claimed in one of claim 1 or 4, characterized in that a spring is arranged between the seat part and the member.

6. The vehicle seat of claim 1 further comprising a slotted guide having first and second openings; and a fixing device on the backrest member.

7. The vehicle seat of claim 6 further comprising a projection arranged on the lever which projection cooperates with the first and second openings in the slotted guide.

8. The vehicle seat of claim 2 wherein the lever is curvilinear-shaped.

9. The vehicle seat of claim 2 wherein the lever substantially covers the member during movement of the backrest from the in-use position to the stowage position.

10. The vehicle seat of claim 1 wherein the vehicle seat is for use in a row of seats including a second seat having a second backrest; and the backrest is adjustable in inclination about an axis of rotation which corresponds to an axis of rotation of the second backrest of the second seat.

11. The vehicle seat of claim 10 wherein the backrest of the vehicle seat is locked to the second backrest of the second seat in the in-use position.

12. The vehicle seat of claim 10 wherein when the vehicle seat is in the stowage position and the backrest length is shortened, the vehicle seat can be stowed under the seat part of the second seat part.

\* \* \* \* \*